United States Patent [19]

Sakaguchi et al.

[11] Patent Number: 5,261,621
[45] Date of Patent: * Nov. 16, 1993

[54] METHOD AND APPARATUS FOR EVENLY WINDING MAGNETIC TAPE

[75] Inventors: Masaaki Sakaguchi; Mitsunobu Usui, both of Kanagawa, Japan

[73] Assignee: Fuji Photo Film Co., Ltd., Kanagawa, Japan

[ * ] Notice: The portion of the term of this patent subsequent to Apr. 4, 2006 has been disclaimed.

[21] Appl. No.: 410,037

[22] Filed: Sep. 21, 1989

Related U.S. Application Data

[63] Continuation of Ser. No. 913,297, Sep. 30, 1986.

[30] Foreign Application Priority Data

Nov. 22, 1985 [JP] Japan .................................. 60-261544

[51] Int. Cl.$^5$ .............................................. G11B 15/32
[52] U.S. Cl. ............................... 242/67.10 R; 242/179
[58] Field of Search ............... 242/78.1, 56 R, 67.1 R, 242/179; 360/66, 118

[56] References Cited

U.S. PATENT DOCUMENTS

| | | | |
|---|---|---|---|
| 2,604,831 | 7/1952 | Fraenckel | 226/196 |
| 2,610,806 | 9/1952 | Lathrop | 242/84.52 B |
| 3,086,729 | 4/1963 | Mayhew | 242/78.1 |
| 3,265,321 | 8/1966 | Rahn | 242/78.1 |
| 3,660,727 | 5/1972 | Ohira | 360/66 X |
| 4,157,581 | 6/1979 | Keiichi | 360/66 X |
| 4,310,130 | 1/1982 | Ichiyanagi | 242/179 |
| 4,343,441 | 8/1982 | Graham | 242/68.3 X |
| 4,396,962 | 8/1983 | Beaujean | 242/199 X |
| 4,422,589 | 12/1983 | Okada | 242/68.3 X |
| 4,462,055 | 7/1984 | Jackson | 360/66 X |
| 4,512,527 | 4/1985 | Rehklau | 242/56 R |
| 4,566,647 | 1/1986 | Iwamoto | 242/67.1 R |
| 4,817,884 | 4/1989 | Sakaguchi | 242/67.1 R |
| 4,828,197 | 5/1989 | Sakaguchi | 242/67.1 R |
| 4,909,455 | 3/1990 | Sakaguchi | 242/67.1 R |

FOREIGN PATENT DOCUMENTS 61-51642 3/1986 Japan .
2073150 10/1981 United Kingdom ............... 242/78.1

*Primary Examiner*—Katherine Matecki
*Attorney, Agent, or Firm*—Sughrue, Mion, Zinn, Macpeak & Seas

[57] ABSTRACT

A method and apparatus for winding a magnetic tape in which a magnetic field is applied to the magnetic tape in its width direction as it is being wound on a reel in order to even the edges of the wound tape.

19 Claims, 5 Drawing Sheets

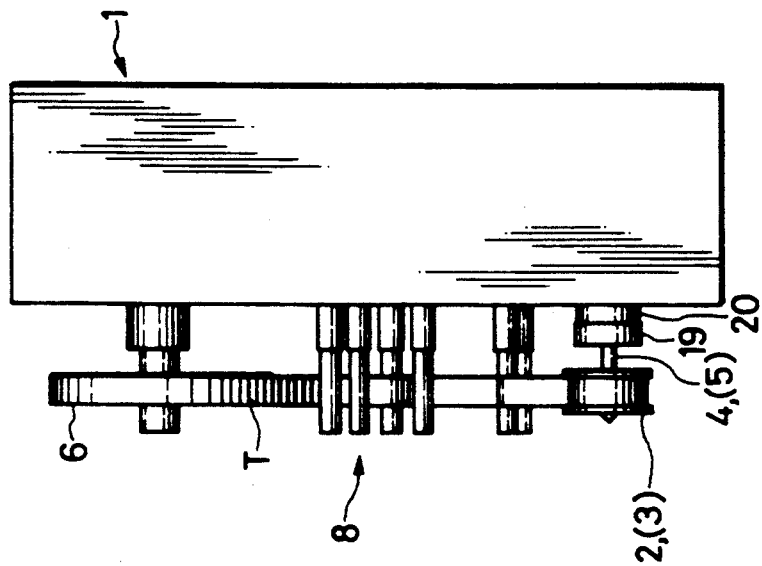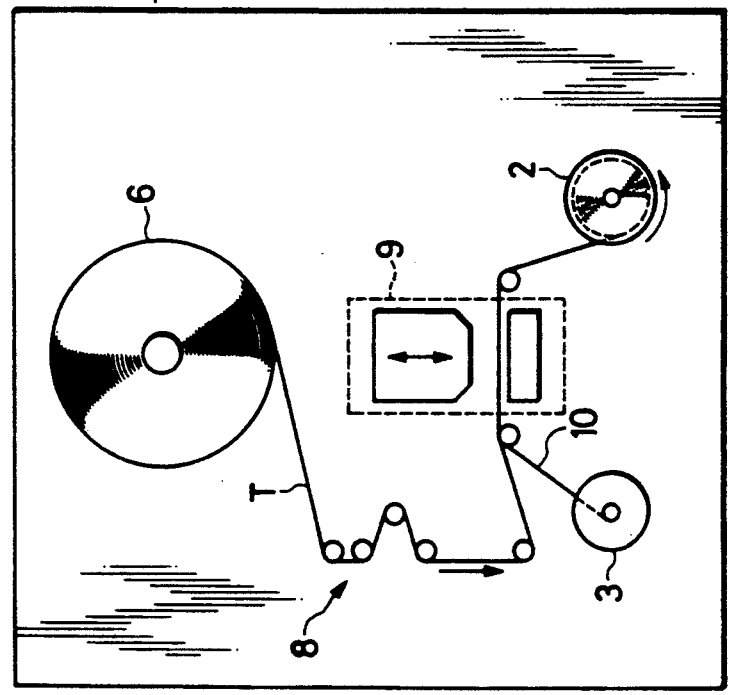

METHOD AND APPARATUS FOR EVENLY WINDING MAGNETIC TAPE

This is a continuation of application Ser No. 06/913,297 filed Sep. 30, 1986.

BACKGROUND OF THE INVENTION

1. Field of the Invention

The present invention relates to a method and apparatus for winding magnetic tape in various situations such as winding a predetermined length of a tape equal in width to the finished product from a bulk roll onto a small tape winding device, rewinding a magnetic tape from one winding device to another, or slitting a web broader than the finished product into widths of the finished product and winding them around a plurality of winding devices.

2. Background Art

Manufacture of magnetic tapes for use as audio cassette tape, video cassette tape, memory tape and broadcasting video tape include intermediate processing steps such as: winding a very long tape from a bulk roll onto small tape winding devices (e.g., reels, hubs and spools) in predetermined lengths; rewinding a magnetic tape from one winding device to another; and slitting a web broader than the finished product into equal widths appropriate for the finished product and winding them around a plurality of winding devices.

In these winding or rewinding steps, if either the physical properties of the tape on a bulk roll on the feed side, or the tape winding device on the takeup side, or the magnetic tape itself are not appropriate, the "behavior" of the tape being wound up will experience variations as manifested by fluctuations in the thickness and width directions of the tape. These changes in tape behavior present serious problems associated with the appearance of the wound tape in that the tape edge as seen in the axial direction of the winding device is irregular and jagged. This phenomenon is particularly pronounced when the tape is running at high speed during winding.

In addition to its poor appearance, such an irregularly wound tape is liable to be damaged at the tape edge. The damage will induce various troubles such as degraded electromagnetic conversion characteristics. The influence of irregular winding is particularly serious with magnetic tapes, such as video tape, which are intended for high-density recording because audio signals and tracking control signals are recorded in the vicinity of the edge of these tapes.

In order to avoid irregular winding, it is normal in the conventional manufacture of magnetic tape to visually check every winding device, for example after the tape has been wound or rewound around it. However, the cost and time required for such inspection is quite substantial and has represented a bottleneck in the production of magnetic tapes.

With a view to reducing this inspection burden and yet achieving a neatly wound tape, those magnetic tapes which potentially have a high rejection ratio in terms of their appearance after winding have been wound by the "finish winding" method operating on the mechanism depicted in FIGS. 7 and 8.

FIGS. 7 and 8 are perspective views showing schematically the components positioned around a takeup winding device (reel) 2 in two types of such a finish winding mechanism. In the mechanism shown in FIG. 7, a flexible endless belt 11 that is typically made of rubber or polyimide and which is rotatably supported on rollers 12, 13 and 14 travels with magnetic tape T as it elastically urges the magnetic surface of T toward the winding device 2 in its radial direction, thereby permitting the tape T to be wound in a neat shape. In the mechanism shown in FIG. 8, a belt 15 made of a comparatively soft nonwoven fabric or a like material is provided between one flange of the winding device 2 and the edge of the tape T facing the flange of the winding device 2. The belt 15 serves to permit the tape T to be neatly wound by urging the edge of one end the winding tape T as the belt 15 is slowly rewound at a constant speed from a delivery side 16 to a takeup side 18 and as it is being guided on rollers 17.

In either type of the mechanism shown, the finish winding belt 11 or 15 makes direct contact with the magnetic tape T and sometimes fails to achieve its intended function in that it causes dropouts as a result of the abrasion of the magnetic layer or the shedding of fibers from the nonwoven fabric Also, it may deform the tape T or damage its edge when subjected to an inappropriate urging pressure In addition, the conventionally employed finish winding mechanism rapidly wears out and poses a problem in terms of both economy and maintenance. Another disadvantage results from the fact that the finish winding mechanism must be so designed that it is displaced to an inactive position before replacement of a different tape winding device 2 and to an active position after the replacement has been completed. This design leads to a complicated winding apparatus and increases the time required for achieving replacement of tape winding devices, which is a definite obstacle to improvement of the production rate of magnetic tapes.

Two methods are currently employed to wind modern cassette tapes. One is the "open" winding method wherein the magnetic tape that has been wound by the above-described finish winding method is installed in a cassette to make a finished product The other method is generally referred to as "in-cassette" winding (or C-0 or V-O winding according to the trade terms) wherein magnetic tape is wound up in the final stage of the cassette assembly line.

An apparatus used to implement the "in-cassette" winding method is shown schematically in FIGS. 9 and 10. All of the necessary components other than the magnetic tape are first assembled into a cassette 23. Subsequently, a tape reel 2 on the delivery end which is pre-connected by a short leader tape 10 to another reel 3 on the takeup end and the reel 3 are inserted into the cassette 23 and screwed down to thereby provide a work piece (which is commonly referred to as V-O or C-O) The leader tape 10 is drawn from both reels 2 and 3 and out the cassette with an "in-cassette" winder and cut into two halves. One half of the leader tape 10 is spliced to one end of the magnetic tape T to be wound up while the other half is retained on a suction member 22. The delivery reel 2 for the spliced tape is rotated until a predetermined length of tape T has been wound up. After the wound tape is cut, the end point of the tape T is spliced to the other half of the leader tape 10 so as to provide a completed product. Because of the absence of any mechanical contact with the magnetic tape in each winding device, the neatness of the tape which has been wound by the "in-cassette" method is totally dependent upon the physical properties of the tape and possible variance in the quality of individual cassette components. This complete failure to achieve control over the neatness of wound tape has been responsible for the very high rejection ratios encountered in the use of the "in-cassette" winding method. With a view to enabling the winding of magnetic tape to produce in a neat final shape, a roller 24 having flanges 25 on both ends is provided at the entrance of the cassette through which the magnetic tape is wound and attempts have been made to urge the tape to one flange on the roller by exerting a force in the direction of the tape width. As it turned out, however, this approach is virtually useless and the "in-cassette" winding method is still in the state of lacking any effective means for permitting the magnetic tape to be wound in a satisfactorily neat overall shape.

SUMMARY OF THE INVENTION

An object of present invention is to eliminate all of the aforementioned defects of the conventional magnetic tape winding method and apparatus.

Particular one object of the present invention is to provide a method and apparatus which are capable of winding a magnetic tape without causing any irregularity in the tape wound up by a winding device even if there exists some variance in the physical properties of the tape.

Another object of the present invention is to provide a method and apparatus which are capable of winding a magnetic tape in an efficient manner and which yet eliminates the inherent problems of the "finish winding" method involving mechanical contact with the tape, such as the increase in the complexity of the winding apparatus and deterioration of the tape quality resulting from various side effects.

Still another object of the present invention is to provide a method and apparatus which allow a magnetic tape to be wound up in a highly neat overall shape even if they are applied to the "in-cassette" winding method which as heretofore completely lacked an effective means for attaining a neatly wound tape.

The aforementioned objects of the present invention can be attained by a method of winding a magnetic tape wherein the tape is wound up by a tape reel while a magnetic field is applied to at least the vicinity of said reel in a direction which is substantially parallel to the direction of the tape width. The invention also includes an apparatus for implementing the method. This apparatus winds a magnetic tape around a rotating tape reel, wherein at least one magnet generates a magnetic field acting in a direction which is substantially parallel to the direction of the tape width. This magnet is provided in at least the vicinity of said winding device.

BRIEF DESCRIPTION OF THE DRAWINGS

FIG. 1 is a front view showing schematically the winding apparatus of the present invention in accordance with one embodiment thereof;

FIG. 2 is a schematic side view of the winding apparatus shown in FIG. 1;

DETAILED DESCRIPTION OF THE PREFERRED EMBODIMENTS

Figure 3:
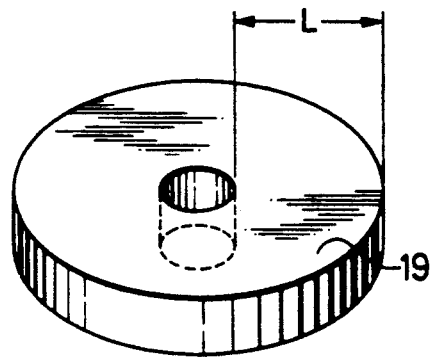
FIG. 3 is an enlarged perspective view of the magnet shown in FIG. 2.

Preferred embodiments of the apparatus which may be used to implement the tape winding method of the present invention are hereunder described in detail.

FIG. 1 is a front view showing schematically the magnetic tape winding apparatus 1 of the present invention according to one preferred embodiment. FIG. 2 is a side view of the apparatus as seen in the direction indicated by arrow A. This winding apparatus 1 may be used in the case where a magnetic tape T is loaded into a video tape cassette after it has been wound around a pair of tape winding devices 2 and 3 (hereinafter simply referred to as tape reels).

The basic operation of the winding apparatus 1 is hereunder described. First, tape reels 2 and 3 are pre-connected to each other by a short leader tape 10 of a predetermined length (only one half of the leader tape is shown in FIG. 1). The pre-connected reels 2 and 3 are mounted on respective shafts 4 and 5, which are rotatably driven on the apparatus 1. The leader tape 10 is cut into substantially equal halves and the end of one half which is on the side of the tape reel 2 is spliced by, for example, a splicing tape, to the leading edge of a pre-loaded web of magnetic tape on a bulk roll 6. After a predetermined length has been around the tape reel 2, the magnetic tape T is cut and spliced to the leader tape 10 on the side of the other tape reel 3.

The cutting of the leader tape 10 and the magnetic tape T and splicing of the two tapes are achieved by a cutting/splicing means 9 provided with a tape end retainer on the side of the reel 3, a cutter, a splicing tape and other necessary parts. The magnetic tape T delivered from the bulk roll 6 is wound onto the tape reel 2 after being threaded along a path 8 comprising guide pins, guide rollers, etc. The cutting/splicing means 9 is not shown in FIG. 2.

Figure 4:
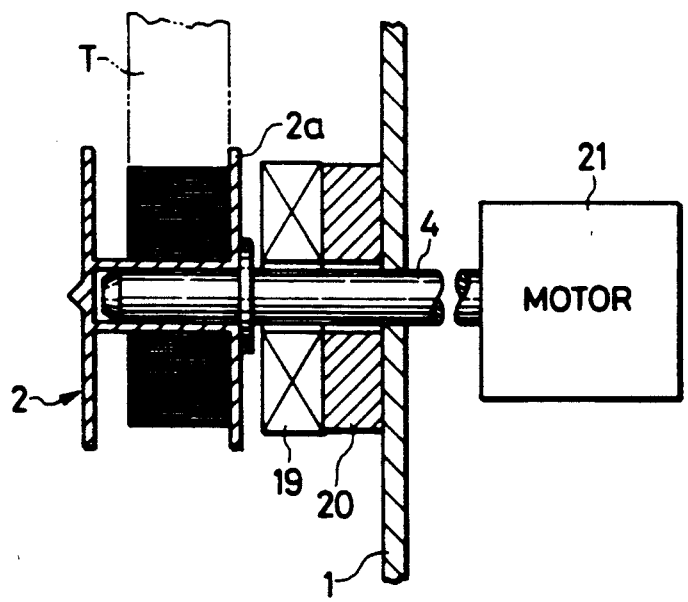
FIG. 4 is an enlarged cross section of the area along the shaft 4 shown in FIG. 2.

The above-described construction of the winding apparatus 1 is identical to that of the prior art apparatus and the heart of the present invention lies in the area where the tape reel 2 is mounted in that a permanent magnet 19 having an annular shape as shown in FIG. 3. As shown in FIG. 4, the magnet 19 is mounted around the shaft 4 which engages the center hole of the tape reel 2 around which the magnetic tape T is to be wound. The permanent magnet 19 which is typically retained on a support 20 is mounted on the body of the winding apparatus 1 and the situated close to one flange 2a of the tape reel 2. The width, L, of the permanent magnet 19 along the tape reel 2 is desirably greater than the difference between the radius of the circle formed by the outermost layer of the tape when completely wound onto the tape reel 2 and the radius of the hub of the reel 2.

The winding apparatus 1 having the aforementioned feature at the takeup end will achieve the winding of the magnetic tape T in the following manner. The tape T is attracted toward the permanent magnet 19 by the magnetic field and is drawn into the tape reel 2 in such a way that the edge of one side of the tape T is brought into contact with the flange 2a of the tape reel 2. The direction of the magnetic field depends on the type of magnetic material used in the tape T but should be such as to attract the magnetic material toward the magnet 19. The part of the tape which has already been drawn into the tape reel 2 is also subjected to the magnetic force and hence is retained in a stable condition. In other words, the tape T with a coating of magnetic particles can be urged by the magnetic field without requiring any mechanical contact with the tape. As a consequence, the tape T can be wound up in a very neat overall shape without experiencing any irregularity in the direction of the tape width. In the case of high-speed winding of the magnetic tape T, air is drawn into the tape reel 2 along with the tape T to form an air cushion between individual layers of the already wound tape, thereby enabling the tape T being drawn to easily move in the direction of the tape width. As a result, all of the layers of the tape can be readily wound, by the action of the magnetism of the magnet 19, into a neat overall shape with no jagged edges being produced.

The strength of magnetism generated by the permanent magnet 19 is not limited to any particular value and may be appropriately determined in consideration of various factors such as the tape tension being applied during winding, the type of the magnetic tape T to be wound, the distance between the magnet 19 and the tape T, the winding speed (tape transport speed) and the possible effects of the magnetic field on the tape T. If necessary, the magnetic field may be subsequently removed (i.e., demagnetized).

In the embodiment shown above, the permanent magnet 19 is fixed at a predetermined position but this is not the sole embodiment of the present invention. Instead, the magnet 19 may be designed to be movable along the motor shaft 4 so that the strength of the magnetism acting on the tape T can be freely adjusted.

Figure 5:
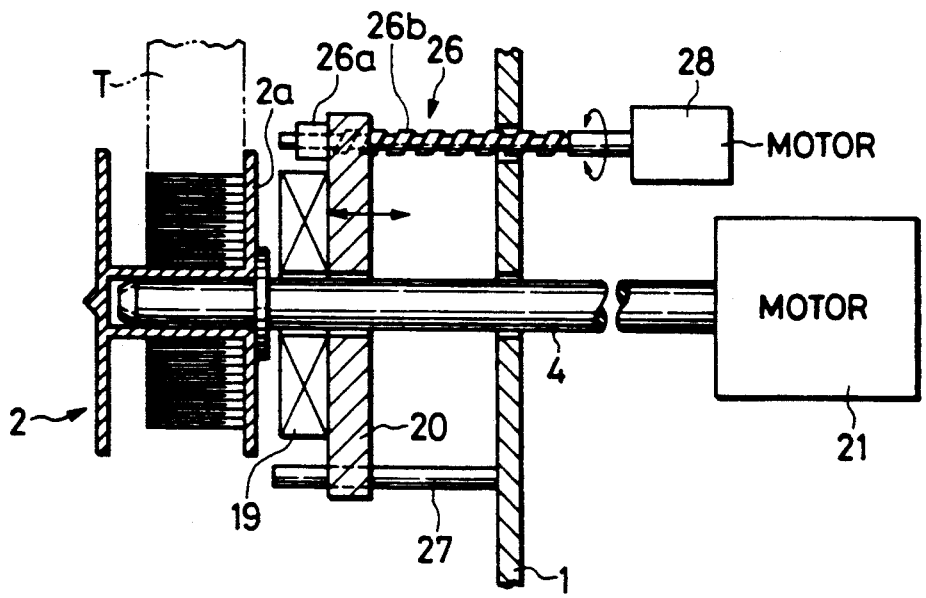
FIGS. 5 and 6 are cross sections showing the essential components used in two other embodiments of the present invention.

An example of the means for causing the magnet 19 to move along the shaft 4 is illustrated in FIG. 5 and consists of a ball screw 26 and a shaft 27, both of which serve to retain the support 20. In the embodiment shown in FIG. 5, the shaft 27 slidably guides the support 20 while the ball screw 26 is screwed through a female threaded portion 26a fixed to the support 20 and its male threaded portion 26b is coupled to a stepping motor 28. Thus the ball screw 26 is rotated in such a manner that the magnet 19 is moved toward or away from the magnetic tape T.

In the embodiment shown in FIG. 5, one ball screw 26 and one shaft 27 are employed. In a modified case, a plurality of ball screws 26 and shafts 27 may be arranged in an appropriate fashion so as to ensure a smoother movement of the magnet 19 along the motor shaft 4.

If, as shown above, the magnet 19 is designed such that the distance from the magnetic tape T can be freely adjusted, the magnetic field to be applied to the tape can be adaptively controlled with great ease irrespective of the characteristics of the tape which depend on the specific type of tape, e.g. an iron oxide tape or a metallic particle tape. As a result, application of an unduly strong magnetic field which can cause such troubles as a damaged tape edge is avoided and the ability of a magnetic field to ensure that the magnetic tape T is wound in a neat overall shape can be exhibited to the fullest extent.

In this connection, it should be mentioned that the means for moving the magnet 19 is not limited to the one shown in FIG. 5 and may be formed of other devices such as a power-driven cylinder and a pneumatic positioning cylinder. The permanent magnet 19 need not have an annular shape that is substantially identical to that of the flanges of the tape reel 2 and which surrounds the entire periphery of the shaft 4. The magnet may be disposed in such a manner that it produces a magnetic field only in the region through which the tape T is drawn into the tape reel 2. Various modifications can also be made to the shape of the magnet.

In the embodiments shown above, the permanent magnet 19 is provided on one side of the tape reel 2 but the present invention is not limited to this particular case and another magnet may be disposed opposite to the magnet 19 with respect to the tape reel 2 so that magnetic lines of force will pass through the space between the two magnets. In this modified case, the direction of the magnetic flux in the tape reel 2 is in complete alignment with the axis of the shaft 4 and the tape T is subjected to a magnetic force that acts with a highly stabilized directivity. If two permanent magnets are employed as described above, the strength of the magnetism of each magnet and its position relative to the magnetic tape T should be appropriately adjusted in order to allow the tape T to be biased to one side of the tape reel 2.

The permanent magnet employed in each of the embodiments shown above may be replaced by an electromagnet. The magnetism of an electromagnet can be freely adjusted by changing the amount of current flowing through it.

The winding apparatus 1 shown above has the magnet 19 positioned solely on the shaft 4 but the present invention is not limited to this particular embodiment. If desired, additional magnets may be appropriately disposed along the tape transport path 8, with magnetism being caused to act in the direction of the tape width so that the tape T can run smoothly without any vibration being produced in the direction of its width.

Figure 6:
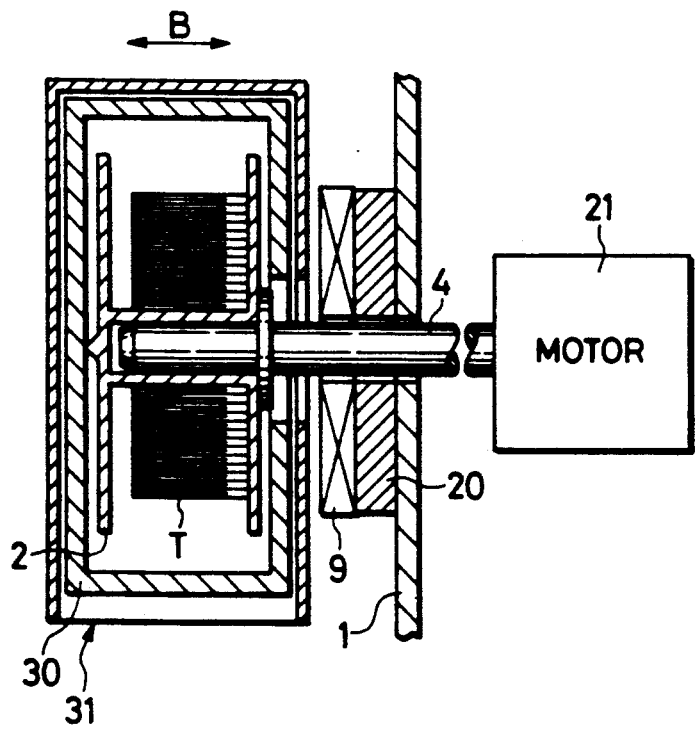
Figure 7:
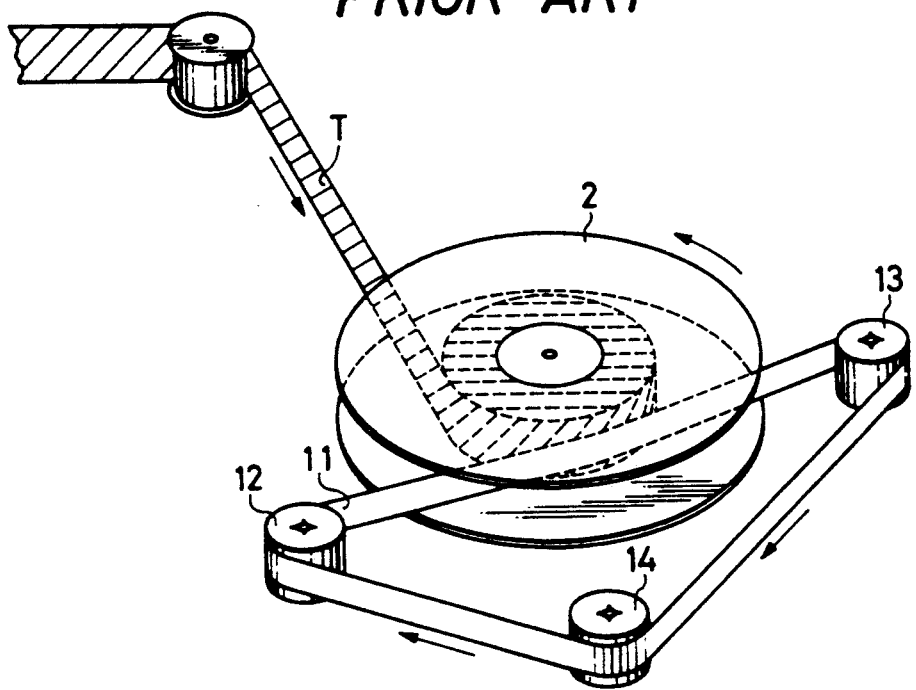
FIG. 7 and 8 are perspective views showing schematically part of two conventional tape winding apparatus.
Figure 8:
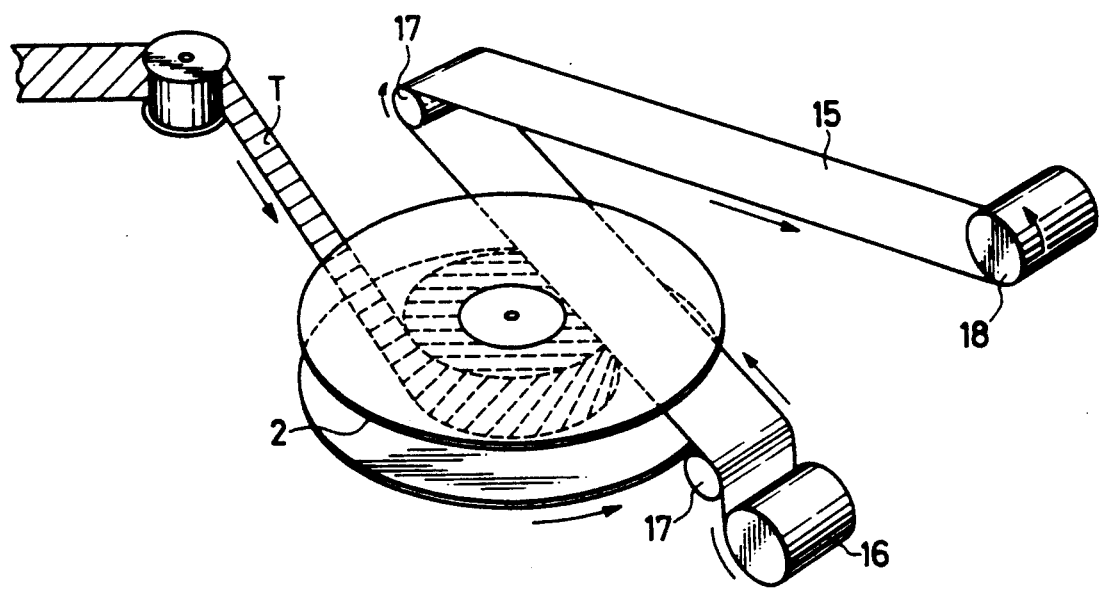
Figure 9:
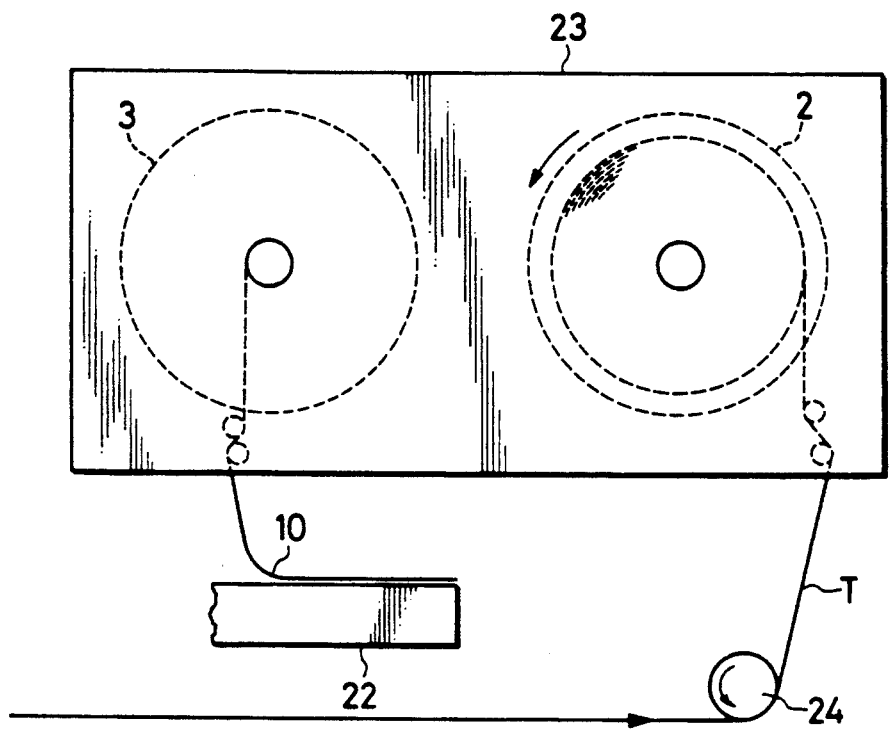
FIG. 9 is a plan view showing schematically a conventional apparatus for winding magnetic tape by the "in-cassette" method.
Figure 10:
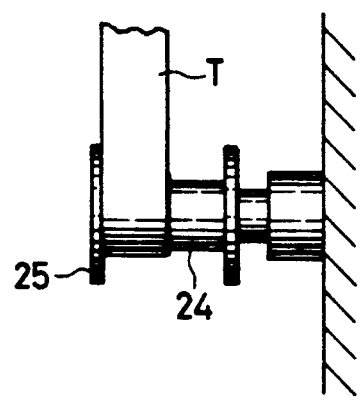
FIG. 10 is a partial enlarged side view of FIG. 9.

The description of the foregoing embodiments assumed that the winding apparatus 1 is used to implement the "open reel" winding method. However, it should be noted that the apparatus can also be applied to other winding methods, for example, the "in-cassette" winding method as illustrated in FIG. 6. FIG. 6 shows in cross section a cassette case 30 that accommodates a pair of tape reels 2 and which is enclosed with a retaining mechanism 31. The means for holding the retainer 31 is not shown in FIG. 6. As in the conventional apparatus, the retaining mechanism 31 has a downwardly facing opening through which the cassette can be taken out and it can be displaced, as required, along the motor shaft 4 in the direction indicated by arrow B so as to facilitate detachment or attachment of the cassette case 30. A magnet 19 as retained on a support 20 is provided underneath the retainer mechanism 31 (i.e., on the panel side of the apparatus) in the same manner as shown in FIG. 4. The magnet 19 attracts the tape T and allows it to be wound up in a highly neat overall shape.

It should also be emphasized that the present invention is not limited to the embodiments described above. The invention can be applied to an apparatus by which a web on a bulk roll that is wider than the finished product is slit into parallel pieces each of an equal width and subsequently wound onto a plurality of winding devices.

As described in the foregoing pages, the present invention utilizes a magnet such that a magnetic tape being wound is subjected to magnetism acting in the direction of its width and this provides for highly smooth tape running so that the tape can be wound up in a very desirable overall shape that is entirely free from jagged edges. In addition, by adopting a mechanism that allows for a varying distance between the magnet and the tape, a magnetic field that is optimum for the specific type of magnetic tape being wound can be attained. The present invention involves no mechanical contact with the magnetic tape in the process of ensuring that it is wound up in a desirable neat overall shape and, therefore, the present invention will help improve the quality of the magnetic tape without causing any of the troubles that have been encountered with the prior art "contact" winding system such as tape bending and damage to the tape edge or the magnetic surface of the tape. Another great advantage of the present invention is that it provides a winding apparatus that does not require any complex means for permitting the magnetic tape to be wound in a neat overall shape.

Therefore, the present invention has the advantages of improving the quality of magnetic tape and enabling it to be wound with increased efficiency. These advantages of the present invention are most conspicuous when it is applied to a winding apparatus relying upon the "in-cassette" winding method.

What is claimed is:

1. A method of winding a magnetic tape, comprising the steps of:
    winding a tape containing a magnetic material with a tape winding device including a flanged tape reel; and
    attracting said tape toward a flange of said tape reel using a magnetic field, extending substantially in a single direction substantially parallel to a width direction of the tape where said magnetic field passes through windings of said tape on said reel such that said tape abuts against said flange so as to be neatly wound around said reel.

2. A method as recited in claim 1, wherein said winding device comprises a reel having at least one flange and being rotatable about an axis in a first direction and wherein said magnetic field is applied to said wound tape.

3. A method as recited in claim 1, wherein said applying step applied a variable strength magnetic field.

4. An apparatus for winding a magnetic tape comprising:
    a magnetic tape containing a magnetic material;
    a rotatable tape winding device for winding said tape and including a wound tape support including at least one flange;
    at least one magnetic field producing means for producing a magnetic field at least in the vicinity of said tape winding device, and for attracting said tape toward said magnetic field producing means and said at least one flange such that said tape abuts against said flange so as to be neatly wound around said reel, sand magnetic field being substantially in a single direction substantially parallel to a width direction of said tape where said magnetic field passes through windings of said tape being wound on said tape winding device.

5. An apparatus as recited in claim 4, wherein said magnetic field source is at least one magnet.

6. An apparatus as recited in claim 5, wherein said magnet is disposed around said shaft, said magnet extending in a radially outward direction of said tape winding device at least as far as a maximum radius of said tape wound in said tape winding device.

7. An apparatus as recited in claim 6, wherein said magnet has a generally annular shape.

8. An apparatus as recited in claim 5, further comprising means for moving said magnet toward and away from said magnetic tape substantially along said width direction.

9. An apparatus as recited in claim 8, wherein said magnet has a generally annular shape.

10. An apparatus as recited in claim 5, wherein said magnet has a generally annular shape.

11. An apparatus as recited in claim 4, wherein said tape winding device comprises a reel rotatable about an axis substantially parallel to said width direction and having at least one flange and said magnetic field source is disposed proximate said flange.

12. An apparatus as recited in claim 11, wherein said magnet has a generally annular shape.

13. An apparatus as recited in claim 4, further comprising:
    a rotatable shaft on which said tape winding device is mounted; and
    means for rotating said shaft.

14. An apparatus as recited in claim 13, wherein said magnet has a generally annular shape.

15. An apparatus as recited in claim 4, further comprising means for varying a strength of said magnetic field in said vicinity of said tape winding device.

16. A apparatus as recited in claim 4, wherein said magnetic field source is an electromagnet.

17. An apparatus as recited in claim 4, wherein said tape winding device is a first tape winding device;
    and further comprising;
    a second tape winding device;
    a leader tape connecting said first and second tape winding devices;
    a cassette case accommodating said first and second tape winding devices;
    a mechanism for holding said cassette case; and
    means for leading said tape to be wound directly into said cassette case.

18. An apparatus as recited in claim 17, wherein a part of a wall of said cassette is disposed between said first tape winding device and said magnetic field source.

19. An apparatus as recited in claim 18, wherein a part of a wall of said holding mechanism is disposed between said cassette and said magnetic field source.

* * * * *